United States Patent [19]

Lanter et al.

[11] 4,211,796
[45] Jul. 8, 1980

[54] FEED INTAKE LIMITING COMPOSITION FOR CATTLE

[75] Inventors: Kent J. Lanter, Belleville, Ill.; Norman L. Betz, St. Louis; Danny L. Williams, Manchester, both of Mo.

[73] Assignee: Ralston Purina Company, St. Louis, Mo.

[21] Appl. No.: 849,740

[22] Filed: Nov. 9, 1977

[51] Int. Cl.$^2$ .................................................. A23K 1/00
[52] U.S. Cl. ............................................ 426/2; 426/74; 426/623; 426/630; 426/635; 426/807; 568/844; 568/680; 568/676; 560/263
[58] Field of Search ................ 426/2, 74, 601, 606, 426/611, 629, 635, 648, 656, 646, 807, 658, 630, 623; 424/343; 260/615 R; 560/263; 568/844

[56] References Cited

U.S. PATENT DOCUMENTS

| | | | |
|---|---|---|---|
| 1,958,295 | 5/1934 | Christensen et al. | 426/807 X |
| 2,257,899 | 10/1941 | Britton et al. | 568/844 |
| 3,669,676 | 6/1972 | Karr et al. | 426/807 X |
| 3,934,037 | 1/1976 | Lewis et al. | 424/343 |

OTHER PUBLICATIONS

Rose et al., "The Condensed Chemical Dictionary" Van Nostrand Reinhold Co., 1970, pp. 241 and 420.

Primary Examiner—R. B. Penland
Attorney, Agent, or Firm—Virgil B. Hill

[57] ABSTRACT

A composition for limiting feed supplement intake for cattle is disclosed which comprises at least one member of a group of compounds having the formula:

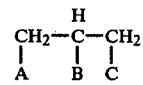

wherein
A is a hydroxyl or R
B is a halogen or hydroxyl or R
C is a halogen, or C is a hydroxyl in the event that B is a halogen or C is a hydroxyl if B is also a hydroxyl
and A is R wherein

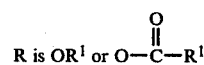

and preferably wherein $R^1$ is a $C_9$-$C_{18}$ alkyl

19 Claims, No Drawings

FEED INTAKE LIMITING COMPOSITION FOR CATTLE

BACKGROUND OF THE INVENTION

This invention relates to a feed intake limiting composition for cattle and a process for employing the same in order to attain an economical and efficient means of self-feeding cattle.

In the feeding of animals on pasture, particularly cattle, it is often very advantageous from the standpoint of economics, as well as convenience, for the cattle to be self-fed, which means that the cattle are offered a feed or feed supplement on a free choice basis without periodic feedings of a rationed amount by a farmer or rancher each day. A disadvantage, however, of self-feeding animals such as cattle is that the animals tend to over-eat feed supplements and consequently get a higher intake of supplement than is completely necessary for proper weight gain or weight maintenance. This results in an additional expense to the rancher in having to provide additional and unnecessary amounts of feed supplement to be fed in combination with a roughage source such as grass or hay.

It is, therefore, desirable to limit the intake of the feed supplement to an amount which is the proper amount needed for weight gain or weight maintenance without consumption of more than is needed by the animal. The prior art has also incorporated salt or gypsum in the feed supplement in order to control consumption of the supplement to a prescribed amount. A disadvantage, however, in employing either one of these compounds to control consumption of the supplement and provide an effective self-limiting feed composition is that both materials provide little nutritional value and require mixing in large quantities with the supplement in order to reduce consumption thereof. For example, one part of salt to three parts of protein or feed supplement will ordinarily be required to reduce daily consumption in cattle to the desired amount. Another disadvantage of employing these materials is that salt poisoning of the animals may occur if water is not freely available.

U.S. Pat. No. 3,669,676 provides a solution to the above disadvantages by describing a feed intake limiting composition for cattle comprising a mixture of fish oil, ammonium sulfate, diammonium phosphate, and meat meal. This mixture can be added to a feed supplement which can then be offered on a free choice basis to cattle in combination with a roughage source such as grass or hay. The combination of these materials contribute to the nutrient requirements for the feed supplement as well as effectively controlling intake of the supplement to a prescribed amount. While this composition has proven to be extremely desirable and effective as an intake limiter, the availability of certain components of the mixture as well as a continuing need for other limiters which effectively control intake to a prescribed degree and contribute to the nutritive properties of the feed supplement has necessitated the development of the feed intake limiting composition of the present invention.

Liquid feed supplements are also widely used for the feeding of cattle, and these consist primarily of a carbohydrate solution such as molasses. These supplements are highly palatable, however, and to limit consumption by the animal, special equipment has been designed to "meter" the desired quantity of liquid supplement to the animal. This requirement for special equipment has, therefore, offset many of the economic advantages of liquid feeds and a need exists for a liquid feed supplement which is self-limiting. This need has also been met by the intake limiting composition of the present invention.

SUMMARY OF THE INVENTION

The feed intake limiting composition of the present invention comprise compounds and mixtures thereof having the formula:

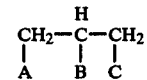

wherein
A is a hydroxyl or R
B is a halogen or hydroxyl or R
C is a halogen, or C is a hydroxyl in the event that B is a halogen or C is a hydroxyl if B is also a hydroxyl and
A is R
wherein $$R \text{ is } OR^1$$

and preferably wherein $R^1$ is a $C_9$–$C_{18}$ alkyl

These materials can be added to a feed supplement either liquid or meal in an amount effective to limit feed intake for cattle either with or without other intake limiters such as meat meal, diammonium phosphate and ammonium sulfate.

The above compounds are not only effective in limiting intake, but when combined with other limiters such as those described above, they do not detract from or destroy the nutritional balance of the feed supplement. The noted composition does not require feeding in a large quantity and provides a convenient and economical means of limiting the feed supplement intake in cattle when incorporated into the feed supplement.

An object, therefore, of the present invention is to provide for a composition which consists of components which effectively limit feed supplement intake to a predetermined amount in order to allow self-feeding of the cattle.

It is also an object of the present invention to provide a method for limiting feed supplement intake by cattle by feeding a composition comprising various materials which effectively limit supplement intake when combined with a roughage source to provide a convenient and economical means of feeding cattle.

DESCRIPTION OF THE PREFERRED EMBODIMENTS

In accordance with the present invention, a composition has been developed which is capable of limiting feed supplement consumption or intake to a predetermined amount that is necessary for proper weight maintenance of cattle. This predetermined amount of feed supplement intake for cattle will accordingly vary depending on the type of animals as well as the environmental conditions under which they are maintained and is, therefore, not intended to limit the present invention although it may be generally considered that a typical feed intake limitation for a feed supplement is less than about 8 lbs. of supplement per head of cattle per day, preferably less than 4 lbs. per head per day, and typically will vary between about 2 to 4 lbs. of supplement per head of cattle per day. This amount of intake will generally be the amount of intake which is necessary for proper weight maintenance as well as the most efficient feed utilization by the animal.

The feed intake limiting composition of the present invention comprises a feed supplement containing at least one member of a group of compounds having the formula:

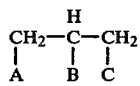

wherein
A is a hydroxyl or R
B is a halogen or hydroxyl or R
C is a halogen, or C is a hydroxyl in the event that B is a halogen or C is a hydroxyl if B is also a hydroxyl and
A is R
wherein

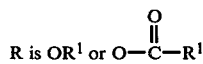

and preferably wherein $R^1$ is a $C_9$–$C_{18}$ alkyl

Preferred materials of the above type which are suitable for use in the present invention include compounds of the above formula wherein $R^1$ is a $C_{12}$ alkyl and compounds having the above formula wherein A is a hydroxyl, B is a chlorine or hydroxyl, and C is a chlorine.

As previously noted, the feed intake limiting composition of the present invention can also comprise a single compound as well as mixtures of the above compounds having the above general structural formula, provided it is used in the feed supplement at a level effective to limit intake and preferably at a level exceeding 0.01% by weight. It is, however, desirable in such instances that a compound of the above type be used in combination with the other ingredients such as a material selected from the group consisting of meat meal, diammonium phosphate, ammonium sulfate, and combinations thereof since these materials also impart desirable nutritive properties to the feed supplement as well as provide the most consistent degree of feed intake limitation under the most widely varying environmental conditions.

Therefore, in one embodiment of the present invention the feed intake limiting composition will contain sufficient ammonium sulfate so that the feed supplement to which the intake limiting composition is added will contain between about 0.1 to 5% by weight of ammonium sulfate, although preferably the amount of ammonium sulfate may be varied between 1 and 4% to achieve a preferred level of intake limitation when used in combination with the preferred amounts of the other ingredients of the intake limiting composition. The type of ammonium sulfate which may be employed in the present invention is not critical to its practice and may be generally of any type considered suitable for feed use and being of sufficient purity to not have harmful effect on the animal.

In one embodiment of the present invention, the feed intake limiting composition may also contain sufficient diammonium phosphate so that the feed supplement to which the composition is added will contain between about 0.1 to 5% by weight of diammonium phosphate. The preferred amount of diammonium phosphate which may be added is between about 2 and 5% by weight in order to achieve the preferred level of intake limitation when used in combination with preferred amounts of other ingredients of the intake limiting composition. Likewise, the present invention is not limited by the type or purity of diammonium phosphate which may be employed, and any source of this material normally considered suitable for feed use may be employed in the present invention.

Also, in the embodiment described above, the intake limiting composition of the present invention may also contain as an ingredient, meat meal or as an equivalent, dry or ground meat scraps of meat by-products in such an amount that the feed supplement to which this composition is added will contain between about 0.1 and 20% by weight of meat meal. Preferably the amount of meat meal may be varied between 3 and 17% by weight of the feed supplement to also achieve the preferred amounts of other ingredients of the intake limiting composition.

Typically, meat meal will not be used as an intake limiting ingredient in liquid feed supplements because of difficulty in getting materials of this type to disperse in a liquid feed. Therefore, the use of meat meal as an intake limiting ingredient is usually restricted to meal or grain type feed supplements.

One type of composition for intake limitation pursuant to the present invention comprises a mixture of a material selected from the group consisting of ammonium sulfate, diammonium phosphate, meat meal, and combinations thereof together with a compound or compounds of the above formula. These can be combined and added as a mixture to a feed supplement or the components of the noted composition may be mixed individually with the feed supplement in predetermined amounts. Furthermore, the feed supplement to which the intake limiting composition of the present invention may be added, may be any liquid or "grain" type supplement which is generally intended to provide the full nutritional requirements of the animal, with the exception of as in the case of cattle, the various roughage sources which are considered to be necessary for proper feed utilization. Therefore, "grain" type feed supplements to which the intake limiting compositions of the present invention may be added, may consist of various grains which are predominately farinaceous or proteinaceous as the case may be. Included among these suitable proteinaceous materials are the vegetable proteins such as soybeans, cottonseed, or peanuts. These are considered to be highly utilizable and available sources of protein for animals. Likewise, various farinaceous materials which contain a lower percentage of protein, but additionally contribute to the protein requirement of the feed supplement, may also be employed among which are grains such as corn, milo, alfalfa or various wheat materials or wheat by-products. If desired, the feed supplement may additionally contain various non-protein nitrogen materials such as urea or biuret or other sources of non-protein nitrogen which ruminant animals specifically utilize and convert to organic protein. This provides a cheap and effective source of nitrogen in a ruminant diet. The feed supplement will also typically contain various minerals considered essential for proper weight maintenance of animals such as cattle as well as various vitamins either fat or water soluble, which typically are added to feed supplements for complete nutritional balance.

A liquid feed supplement medium suitable for use in the present invention generally comprises a liquid medium such as molasses or a liquid carbohydrate solution or a medium including materials such as sugars, pectins, dextrins, starches or other types of soluble carbohydrate materials. Molasses is employed as the preferred liquid feed supplement medium for the supplements of the present invention because of its low cost and availability. The molasses is commonly available as an aqueous solution and has a consistency varying from a thin to a thick syrup falling within the range of 50–90 Brix. The molasses can be any of the sugar containing molasses which are commercially available including cane or blackstrap molasses, converted molasses, wood sugar molasses, citrus molasses, and the like. These contain significant quantities of sugars which are an important source of organic nutrients and a carbohydrate source for the animal. Therefore, it is not intended to limit the present invention by the actual ingredients of a liquid feed supplement since besides the liquid medium as the primary ingredient, it is well known to add other materials to improve the nutritional or functional characteristics of the liquid feed supplement.

In addition to the liquid feed supplement medium, it is also desirable to include a colloid material such as clay including bentonite or attapulgite clay or a vegetable gum such as xanthan gum since this assists in providing a uniformly thickened liquid feed supplement with the desired viscosity. Typical levels of colloid material are between 0.5 and 5% by weight. In the event clay is used in the liquid feed supplements of the present invention, it is also desirable to include a dispersing agent such as a soluble phosphate salt, for example, sodium, potassium, ammonium, tripolyphosphate, pyrophosphate and polyphosphates. This improves dispersability of the clay in the liquid feed supplement medium. Typical amounts of a dispersing agent are between 0.1 to 20% by weight of the clay.

A further ingredient which may be employed in the present invention if desired, are various medicaments or additives to the feed supplement either for the purpose of disease control or for improving performance. Materials of this type include additives such as antibiotics, bacteriostats, hormones, and the like.

For the most effective results, a feed supplement will be fed to the cattle in combination with various cellulosic roughage sources to be used in combination with the feed supplement containing the intake limiting composition. It should be recognized that the particular roughage source which may be utilized in the present invention will be generally dictated by local availability of various forage crops.

For purposes of a full and complete disclosure of the present invention, the following examples are set forth as illustrative rather than limiting embodiments thereof.

EXAMPLE 1

A feed supplement was prepared having the following formula, wherein 0.25% by weight of 3-chloro - 1, 2 propanediol was used as the intake limiter.

| Ingredient | Percent by Weight |
|---|---|
| Cracked Milo | 60.38 |
| Dehydrated Alfalfa | 5.43 |
| Wheat Midds | 10.00 |
| Dicalcium Phosphate | 2.40 |
| Salt | 5.00 |
| Soybean Meal (44% Protein) | 13.59 |
| Urea | 2.80 |
| 3-Chloro - 1, 2 Propanediol | 0.25 |
| Vitamins, Minerals & Antioxidant | 0.15 |

This supplement was fed with a native grass hay to a total of 7 cows for a period of 5 days and the average consumption by the cattle was determined to be 2.0 lbs. of supplement per head of cattle per day.

EXAMPLE 2

A feed supplement was prepared having an identical formula to that of Example 1, except that 0.14% by weight of 2, 3 dichloro - 1 - propanol was used as the intake limiter and the amount of milo was adjusted to 60.49%. This supplement was fed with a native grass hay to a total of 7 cows for a period of 5 days and the average consumption was determined to be equal to 0.9 lbs. of supplement per head of cattle per day.

EXAMPLE 3

A feed supplement was prepared having the following formula:

| Ingredient | Percent by Weight |
|---|---|
| Cracked Milo | 56.05 |
| Dehydrated Alfalfa | 5.00 |
| Wheat Midds | 10.00 |
| Meat Meal | 12.00 |
| Ammonium Sulfate | 2.00 |
| Dicalcium Phosphate | 2.40 |
| Salt | 5.00 |
| Diammonium Phosphate | 2.40 |
| Urea | 1.00 |
| Lauric Acid Monoglyceride (1-monolaurin) | 4.00 |
| Vitamins, Minerals & Antioxidant | 0.15 |

This supplement was fed with a native grass hay to a total of 9 cows for a period of 5 days and the average consumption by the cattle was determined to be 2.4 lbs. of supplement per head of cattle per day.

The above Examples are merely illustrative of the instant invention and it will be understood that various other changes in the details, materials, or steps which have been described may be made without departing from the spirit of the instant disclosure, and such changes and other modifications are intended to be included within the scope of the instant disclosure and appended claims.

We claim:

1. A feed supplement for cattle containing an intake limiting composition, said feed supplement comprising grain, said intake limiting composition being present in an amount effective to limit intake of said supplement said composition comprising at least one member of a group of compounds having the formula:

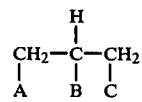

wherein
- A is a hydroxyl or R
- B is a hydroxyl or R
- C is a chlorine or C is a hydroxyl if B is also a hydroxyl and A is R wherein

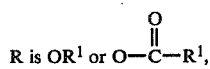

and $R^1$ is a $C_9$–$C_{18}$ alkyl.

2. A feed supplement as set forth in claim 1 wherein said amount effective to limit intake is at least about 0.01% by weight of said supplement.

3. A feed supplement as set forth in claim 1 wherein $R^1$ is a $C_{12}$ alkyl.

4. A feed supplement for cattle containing an intake limiting composition, said feed supplement comprising grain, said intake limiting composition being present in an amount effective to limit intake of said supplement said composition comprising at least one member of a group of compounds having the formula:

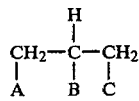

wherein
- A is a hydroxyl
- B is a hydroxyl
- C is a chlorine.

5. A feed supplement as set forth in claim 4 wherein said amount effective to limit intake is at least about 0.01% by weight of said supplement.

6. A liquid feed supplement for cattle comprising a liquid carbohydrate medium containing an intake limiting composition, said composition being present in an amount effective to limit intake of said supplement, said composition comprising at least one member of a group of compounds having the formula:

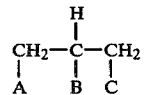

wherein
- A is a hydroxyl or R
- B is a hydroxyl or R
- C is a chlorine or C is a hydroxyl if B is also a hydroxyl and A is R wherein

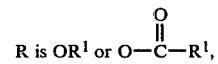

and $R^1$ is a $C_9$–$C_{18}$ alkyl.

7. A liquid feed supplement for cattle comprising a liquid carbohydrate medium containing an intake limiting composition, said composition being present in an amount effective to limit intake of said supplement, said composition comprising at least one member of a group of compounds having the formula:

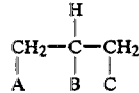

wherein
- A is a hydroxyl
- B is a hydroxyl
- C is a chlorine.

8. A feed supplement for cattle containing an intake limiting composition, said feed supplement comprising grain, said intake limiting composition being present in an amount effective to limit intake of said supplement said composition comprising at least one member of a group of compounds having the formula:

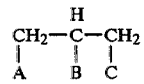

wherein
- A is $OR^1$ or

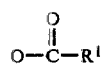

B is a hydroxyl
C is a hydroxyl and $R^1$ is a $C_9$–$C_{18}$ alkyl.

9. A feed supplement as set forth in claim 8 wherein said amount effective to limit intake is at least about .01% by weight of said supplement.

10. A feed supplement as set forth in claim 8 wherein $R^1$ is a $C_{12}$ alkyl.

11. A feed supplement for cattle containing an intake limiting composition said feed supplement comprising grain, said intake limiting composition being present in an amount effective to limit intake of said supplement said composition comprising at least one member of a group of compounds having the formula:

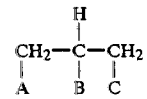

wherein
- A is a hydroxyl or R
- B is a hydroxyl
- C is a chlorine or C is a hydroxyl if B is also a hydroxyl and A is R and wherein
R is $OR^1$ or

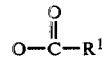

and $R^1$ is a $C_9$–$C_{18}$ alkyl together with a material selected from the group consisting of meat meal, ammonium sulfate, diammonium phosphate, and combinations thereof.

12. The composition of claim 11 wherein the level of meat meal is about 0.1–20% by weight of said supplement.

13. The composition of claim 11 wherein the level of ammonium sulfate is about 0.1–5% by weight of said supplement.

14. The composition of claim 11 wherein the level of diammonium phosphate is about 0.1–5% by weight of said supplement.

15. The composition of claim 11 wherein $R^1$ is a $C_{12}$ alkyl.

16. A method of self-feeding cattle by limiting feed supplement intake to a predetermined amount which comprises feeding said cattle at a level effective to limit intake of said supplement at least one member of a group of compounds having the formula:

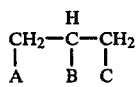

wherein
A is R
B is a chlorine or hydroxyl
C is a chlorine or C is a hydroxyl in the event that B is a chlorine,
and wherein
R is $OR^1$ or

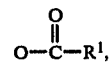

and $R^1$ is a $C_9$–$C_{18}$ alkyl.

17. A method as set forth in claim 16 wherein said supplement includes a material selected from the group consisting of meat meal, ammonium sulfate, diammonium phosphate and combinations thereof.

18. A method of self-feeding cattle by limiting feed supplement intake to a predetermined amount which comprises feeding said cattle at least about 0.01% by weight of said supplement of at least one member of a group of compounds having the formula:

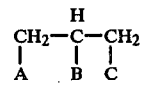

wherein
A is a hydroxyl
B is a hydroxyl
C is a chlorine.

19. A method as set forth in claim 18 wherein said supplement includes a material selected from the group consisting of meat meal, ammonium sulfate, diammonium phosphate, and combinations thereof.

* * * * *